United States Patent
Qi et al.

(10) Patent No.: US 7,542,448 B2
(45) Date of Patent: Jun. 2, 2009

(54) PROVIDING HANDOFF IN A SPREAD SPECTRUM WIRELESS COMMUNICATIONS SYSTEM FOR HIGH RATE PACKET DATA

(75) Inventors: Bi Qi, Morris Plains, NJ (US); Stanley Vitebsky, Morristown, NJ (US); Yang Yang, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 473 days.

(21) Appl. No.: 11/241,822

(22) Filed: Sep. 30, 2005

(65) Prior Publication Data
US 2007/0076663 A1    Apr. 5, 2007

(51) Int. Cl.
*H04Q 7/00* (2006.01)

(52) U.S. Cl. .................. 370/331; 370/328; 370/335; 455/436; 455/437

(58) Field of Classification Search .......... 370/331, 370/328, 503, 335; 455/436, 437
See application file for complete search history.

(56) References Cited

U.S. PATENT DOCUMENTS

| | | | |
|---|---|---|---|
| 6,108,546 A * | 8/2000 | Kusaki et al. | 455/436 |
| 6,259,920 B1 * | 7/2001 | Kusaki et al. | 455/442 |
| 6,414,726 B1 * | 7/2002 | Chauvel | 348/726 |
| 2001/0019957 A1 * | 9/2001 | Kusaki et al. | 455/436 |
| 2003/0007471 A1 * | 1/2003 | Terasawa et al. | 370/335 |
| 2003/0218997 A1 * | 11/2003 | Lohtia et al. | 370/335 |
| 2004/0171407 A1 * | 9/2004 | Ninomiya | 455/561 |
| 2004/0213279 A1 * | 10/2004 | Kusaki et al. | 370/428 |
| 2005/0249162 A1 * | 11/2005 | Kim et al. | 370/333 |

OTHER PUBLICATIONS

"Data Service Options for Spread Spectrum Systems: Radio Link Protocol Type 3" 3GPP2, Sep. 2005.

* cited by examiner

*Primary Examiner*—Danh C Le (57) ABSTRACT

The present invention provides a method and an apparatus for wireless communication between a wireless unit and a set of base stations. The method includes signaling the wireless unit about a plurality of transmissions of same packet data from the set of base stations to enable a soft handoff on a forward link. The plurality of transmissions of same packet data having an unsynchronized relationship. The wireless unit may use a detection/demodulation function, which is capable of simultaneously receiving and decoding signals from two or more sectors (base stations). Instead of soft-combining signals received from multiple cell sectors, the wireless unit independently decodes the received signals. Since soft combining of transmissions is avoided, there is no need to synchronize their transmissions of the same data to a particular wireless unit.

23 Claims, 5 Drawing Sheets

PROVIDING HANDOFF IN A SPREAD SPECTRUM WIRELESS COMMUNICATIONS SYSTEM FOR HIGH RATE PACKET DATA

FIELD OF THE INVENTION

This invention relates generally to telecommunications, and more particularly, to wireless communications.

DESCRIPTION OF THE RELATED ART

Wireless communications systems or mobile telecommunication systems typically provide different types of services to various users or subscribers of wireless communication devices. The wireless communication devices may be mobile or fixed units and situated within a geographic region across one or more wireless networks. The users or subscribers of wireless communication devices, such as mobile stations (MSs) or access terminals or user equipment may constantly move within (and outside) particular wireless networks.

A wireless communications system generally includes one or more base stations (BSs) that can establish wireless communications links with mobile stations. Base stations may also be referred to as node-Bs or access networks. To form the wireless communications link between a mobile station and a base station, the mobile station accesses a list of available channels/carriers broadcast by the base station. To this end, a wireless communications system, such as a spread spectrum wireless communications system, may allow multiple users to transmit simultaneously within the same wideband radio channel, enabling a frequency re-use based on a spread spectrum technique.

In many cellular networks, higher data rates and stringent Quality of Service (QoS) requirements demand an improved management of radio frequency (RF) resources, such as control of transmission power in a wireless communication link. In high-speed wireless data networks, such as Evolved Data Optimized (EVDO), Evolution Data Voice (EVDV), traffic transmission uses different channel feedback techniques. For example, a reverse link traffic channel is used in an EVDO Rev. A network, which incorporates a hybrid automatic repeat request (HARQ) technique with use of a forward automatic repeat request (ARQ) channel to obtain the feedback. A reverse link Data Rate Control (DRC) channel in an EVDO network specifies use of a forward Data Rate Control Lock (DRCLock) channel as the feedback.

Several high rate packet data systems, such as EVDO (Rev0 and RevA) and High Speed Downlink Packet Access (HSDPA) does not support soft handoff capability of circuit-switched and low rate data Code division multiple access (CDMA) systems such as IS-95, CDMA2000 and Universal Mobile Telecommunication System (UMTS) (WCDMA) on the downlink (a.k.a. forward link). Since most high rate packet data systems were originally designed to support best effort data such capability is considered not essential. That is interruptions and gaps in a transmission associated with cell switching (hard handoff) in the absence of soft handoff could be easily tolerated by best effort data traffic. At the same time, transmitting from a single sector (base station) may provide a benefit of an increased system-wide data throughput (resources at one base station only are used) and ease of implementation. However, with the introduction of delay sensitive QoS applications, such as Voice over Internet Protocol (IP) (VoIP) and video telephony into these systems, the reliability, delay and jitter control may become of paramount concern.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method is provided for a wireless communication between a wireless unit and a set of base stations. The method includes signaling the wireless unit about a plurality of transmissions of same packet data from the set of base stations to enable a soft handoff on a forward link. The plurality of transmissions of same packet data having an unsynchronized relationship.

In another embodiment of the present invention, a method is provided for a wireless communication between a wireless unit and a base station. The method includes signaling a request to the base station for transmission of same packet data from a plurality of base station sectors, the transmission of the same packet data having an unsynchronized relationship across the plurality of base station sectors. The method further includes receiving a message indicating a set of at least two base station sectors that intend to transmit the same packet data to the wireless unit in response to the request. A soft handoff on a forward link may be established for the set of at least two base station sectors.

In yet another embodiment of the present invention, a method is provided for a wireless communication between a base station and a wireless unit. The method includes providing a message indicating a set of at least a first and a second base station sectors of a plurality of base station sectors that intend to transmit to the wireless unit. The method further includes scheduling a first and a second transmissions of same packet data having an unsynchronized relationship across the first and the second base station sectors for separately decoding at the wireless unit into a first and a second signals, respectively. In this way, a soft handoff on a forward link may be established.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for providing a soft handoff in a spread-spectrum wireless packet data network for high rate packet data. The method includes signaling to a wireless unit about transmission from and a base station(s) and/or multiple cell sectors. In one embodiment, to establish a soft handoff on a forward link, signaling may request a reduced active set (subset of a reverse link active set) for the forward link handoff transmission. Alternatively, by modifying a data-source channel format (a channel used by current EVDO single sector mode to indicate the preferred sector for forward link packet data transmission), the wireless unit may request switching to a multi-sector transmission mode. The wireless unit may use a detection/demodulation function, which is capable of simultaneously receiving and decoding signals from two or more sectors (base stations). Instead of soft-combining signals received from multiple cell sectors (as done in CDMA standards such as IS-95, CDMA2000 and UMTS using synchronized forward link soft handoff transmissions), the wireless unit independently decodes the received signals. Since soft combining of transmissions is avoided, there is no need to synchronize their transmissions of the same data to a particular wireless unit.

Figure 1:
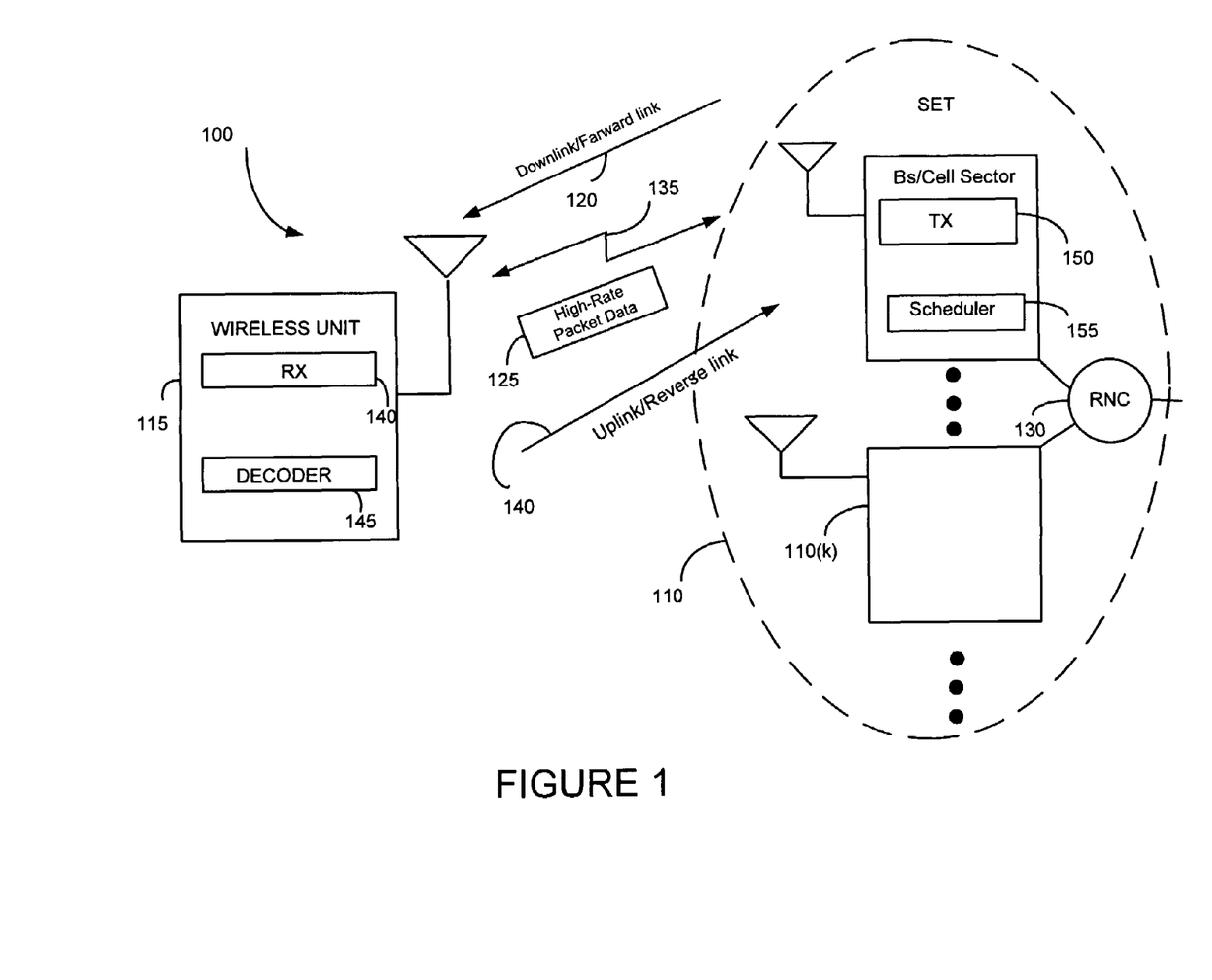
FIG. 1 schematically depicts a wireless spread-spectrum packet data system, which provides a soft handoff for high rate packet data on a forward link according to one illustrative embodiment of the present invention.

Referring to FIG. 1, a wireless spread-spectrum packet data system 100 is illustrated to include a wireless unit 115 and a set of base stations (BSs) 110 (1-k) that may enable a soft handoff on a forward link 120 for high-rate packet data 125 according to one illustrative embodiment of the present invention. The set of base stations 110 (1-k) may provide the wireless connectivity to the wireless unit 115 according to any desirable protocol, including a code division multiple access (CDMA, CDMA2000) protocol, an Evolved Data Optimized (EVDO, 1xEV-DO) protocol, a Universal Mobile Telecommunication System (UMTS) protocol, a Global System for Mobile communications (GSM) protocol, and like.

Examples of the wireless unit 115 may include a host of wireless communication devices including, but not limited to, cellular telephones, personal digital assistants (PDAs), and global positioning systems (GPS) that employ the wireless spread spectrum communications system 100 to operate in a high-speed wireless data network, such as a digital cellular CDMA network. Other examples of the wireless unit 115 may include smart phones, text messaging devices, and the like.

In the wireless spread-spectrum packet data system 100, mobile communications that communicate messages between the set of base stations 110 (1-k) and the wireless unit 115 may occur over an air interface via a wireless channel 135, such as a radio frequency (RF) medium channel that uses a code division multiple access (CDMA) protocol. Although not shown, the wireless channel 135 may include any intermediate devices that facilitate wireless communication between the wireless unit 115 and the set of base stations 110 (1-k). For example, the wireless channel 135 may use a variety of repeaters, antennas, routers, and any desirable communication or network component capable of providing wireless communication. The wireless unit 115 may further communicate with the set of base stations 110 (1-k) using an uplink (reverse link) 140 over the wireless channel 135.

The radio network controller 130 may coordinate a handover of mobile communications upon a user leaving an area of responsibility of a first base station 110(1), into a second base station 110(k). That is, a handover of mobile communications occurs for the wireless unit 115 when responsibility of communication switches from a first cell sector served by the first base stations 110(1) to a second cell sector served by the second base station 110(k).

According to one illustrative embodiment of the present invention, the wireless unit 115 and the set of base stations 110(1-k) may enable a soft handoff so that the wireless unit 115 does not experience a disruption when the first base station 110(1) hands over communications to the second base station 110(k). Soft handoffs allow a base station to communicate with two or more base stations of the set of base stations 110(1-k). For example, the wireless spread-spectrum packet data system 100 may include a frame selector unit (FSU) connected to both the base stations, comparing the frames received by the first and second base stations 110(1) and 110(k) to identify the better frame. This makes it possible for two (or more) base stations of the set of base stations 110(1-k) to seamlessly support the wireless unit 115.

To enable a soft handoff on a forward link 120, the set of base stations 110(1-k) may signal the wireless unit 115 about transmission of same packet data, such as the high-rate packet data 125 having an unsynchronized relationship between the transmissions from different base stations of the set of base stations 110(1-k). To process the high-rate packet data 125, the wireless unit 115 may comprise a receiver 140 and a decoder 145. While the receiver 140 may receive a plurality of transmissions of same packet data from the set of base stations 110(1-k), the decoder 145 may decode the plurality of transmissions of the same packet data independently into a plurality of signals. Each of the signals that are independently obtained upon decoding the transmissions of same packet data from the set of base stations 110(1-k) may be associated with a different cell sector of a base station.

For the purposes of providing signaling about the plurality of transmissions of same packet data to the wireless unit 115, each base station of the set of base stations 110(1-k) may signal the wireless unit 115 an indication about transmission of same packet data therefrom. To this end, each base station 110 may comprise a transmitter (TX) 150 and a scheduler 155 in one embodiment of the present invention. While the transmitter 150 may provide signaling to the wireless unit 115, the scheduler 155 may schedule transmission of same packet data from each base station 110.

According to one embodiment of the present invention, a diversity benefit may be achieved though selection of a correctly received packet at a (RLP) layer and by discarding a duplicate packet if more than one copy is received. In a handoff mode, the radio network controller (RNC) 130 may send multiple copies of the same data stream to multiple sectors 110 participating in the soft handoff. A set of base stations 110 may independently schedule packet transmissions to the wireless unit 115.

To support a handoff capability without changing a data rate request (DRC) channel format, multiple base stations 110 may receive and operate upon the DRC channel independently of a unique code cover it uses. Alternatively, multiple DRC channels for each of the sectors 110 in an active set may be supported. Multiplexing of the DRC channels may be accomplished through time-division using the same code channel or through code-division with simultaneous transmission in time. To send multiple DRC signals, the wireless unit 115 may perform a rate prediction for each of the sectors in a handoff set.

The wireless unit 115 may acknowledge reception of packets from multiple sectors 110 in the active set. For example, the acknowledgement (ACK) channel may be directed to one serving sector may be used for this purpose. To support handoff capability without changing ACK channel format specified by standards for single-sector mode transmission, the ACK channel may be disabled in the multi-sector handoff transmission mode so the maximum number of transmissions for each packet would be used. Alternatively, the ACK channel could by convention be directed at only one of the transmitting sectors (e.g. a sector with the strongest signal) while other sectors would ignore the ACK indication and would use maximum number of transmissions. A handoff regime may be appropriately restricted, i.e., a handoff triggers may be enabled only when signals from several sectors 110 are relatively close in strength. This may limit the impact from the absence of Hybrid Automatic Repeat Request (ARQ) gain due to the ACK channel limitations described above.

Alternatively, multiple ACK channels for each of the sectors 110 in the active set may be supported. Multiplexing of the ACK channels may be accomplished through time-division using the same code channel or through code-division with simultaneous transmission in time. At the physical, media access control (MAC) and radio link protocol (RLP) layers that support a forward link handoff may support a multi-carrier transmission mode from a single sector. For example, the signaling to assign multiple sectors 110 may be used to assign multiple carriers. The DRC and ACK channel structures used to signal rate and ACK decisions to multiple sectors may be used to do the same with respect to multiple carriers. The wireless unit may use multi-sector decoding in a multi-carrier mode.

The wireless unit 115 may use the multi-carrier transmission mode when close to a base station/cell sector 110 where higher data rates are indicated. However, the wireless unit 115 may transition to a multi-sector one-carrier mode when a user moves to the periphery of a cell in handoff region. Also, since a Voice over Internet Protocol (IP) (VOIP) service may not require high rates, a multi-carrier mode may support a multi-sector forward link handoff when executing a VoIP application. As a result, the wireless unit 115 may provide increased reliability, improved delay performance and voice quality.

The wireless unit 115 may simultaneously receive and demodulate the high-speed packet data 125 from two or more base stations/cell sectors 110(1-k) on the same carrier frequency. The wireless unit 115 may determine whether the plurality of transmissions having an unsynchronized relationship, i.e., that happen at different times on each of handoff legs, is actually the same data. The wireless unit 115 may use a set of RLP layer sequence numbers to determine the reception of the same packet data. By examining the RLP layer sequence numbers, the wireless unit 115 may discard the duplicate packets. In other words, duplicate packets may be received asynchronously and discarded.

Since some packets from two handoff legs may be received out of order, so the wireless unit 115 may reorder such packets by using a RLP layer functionality. After the duplicate packets are discarded and the order is determined, the wireless unit 115 may continue to receive a next packet from any of soft handoff legs. Thus, transmissions of the same packet data may happen at different times on different handoff legs and the wireless unit 115 may use the RLP layer functionality to reorder and discard any duplicate packets by processing the transmissions that arrive completely asynchronously (unlike in traditional soft handoff).

The processing of the transmissions that arrive completely asynchronously may be performed by sending a signaling message(s) to the wireless unit 115. The signaling message(s) may cause the wireless unit to prepare to receive the high-speed packet data 125 on multiple handoff legs. Alternatively, the processing of the transmissions that arrive completely asynchronously may be performed by sending a signaling message(s) to the wireless unit 115 to inform about a particular baste station(BS)/cell sector to receive the high-speed packet data 125 from. However, in one embodiment, the wireless unit may negotiate a multi-sector transmission mode when a call initiates and prepare to receive from multiple base stations/cell sectors 110 whenever more than one connections on the reverse link 110 are detected (i.e., the wireless unit 115 is in a soft handoff on the reverse link 140).

In one embodiment, to acknowledge reception of the same packet data from an active set of base station/cell sectors 110 in the soft handoff, a format of an acknowledgement (ACK) channel may be modified. Likewise, modifying a format of a data rate request channel may enable a set of at least the first and the second base station/cell sectors 110(1,k) to independently schedule the first and second transmissions of the same packet data 200(1,2) to the wireless unit 115 without synchronizing transmission of the same packet data.

By modifying a format of a data rate request (DRC) channel and an acknowledgement channel (ACK), the wireless spread-spectrum packet data system 100 may provide a per handoff leg data rate request and acknowledgement channels to use a per handoff leg signaling that is used per carrier in a multi-carrier transmission mode. In this way, a multi-sector transmission mode may be enabled for the forward link 120 on the same carrier of the multi-carrier transmission mode.

In a one-sector, one carrier based forward link, only one acknowledgement channel and a data rate request channel may be transmitted to a serving base station/cell sector 110. To enable multi-sector forward link transmission without changing formats of existing channels, the data rate request channel may be received on the plurality of base station/cell sectors 110(1-k). The acknowledgement channel may be either completely disabled or it may be directed only at one of transmitting base station sectors and ignored by the other base station sectors at which it is not directed.

To switch between a multi-carrier transmission mode and a multi-sector transmission mode, a signal strength of each pilot of each base station/cell sector of the plurality of base stations/cell sectors 110(1-k) may be measured. In response to a majority of pilots indicating that the signal strength to be below a weak signal threshold, a switch from a multi-carrier transmission mode from a signle base station sector to a multi-sector transmission mode on the same carrier of the multi-carrier transmission mode my be initiated. In response to at least one pilot indicating that the signal strength to be above a strong signal threshold, a switch from a multi-sector transmission mode on the same carrier to a multi-carrier transmission mode from a single base station sector may be initiated.

In the wireless spread spectrum packet data system 100, a high-speed wireless data network may deploy any desirable protocol to enable wireless communications between the first and second base stations 110(1-k) and the wireless unit 115 according to any desirable protocol. Examples of such a protocol include a (CDMA, CDMA2000) protocol, an Evolved Data Optimized (EVDO, 1×EV-DO) protocol, a UMTS protocol, a GSM protocol, and like.

A radio network controller (RNC) 130 may be coupled to a first and a second base stations 110(1) and 110(k) to enable a mobile user of the wireless unit 115 to communicate relatively high-rate packet data over a network, such as a cellular network. One example of the cellular network includes a digital cellular network based on a CDMA protocol, such as specified by the 3rd Generation (3G) Partnership Project (3GPP) specifications. The 3G cellular systems provide enhanced voice capacity and support high data rate packet based services. These features are provided in cdma2000 1×EV high rate packet data air system referred to as IS-856. The 3G cellular system CDMA2000 1×EV provides high-speed wireless Internet access to users with asymmetric data traffic relative to a cellular system based on IS-95 standard. For example, data rate of a user of the wireless unit 115 may very from 38.4 kbps to 3.1 Mbps.

Figure 2:
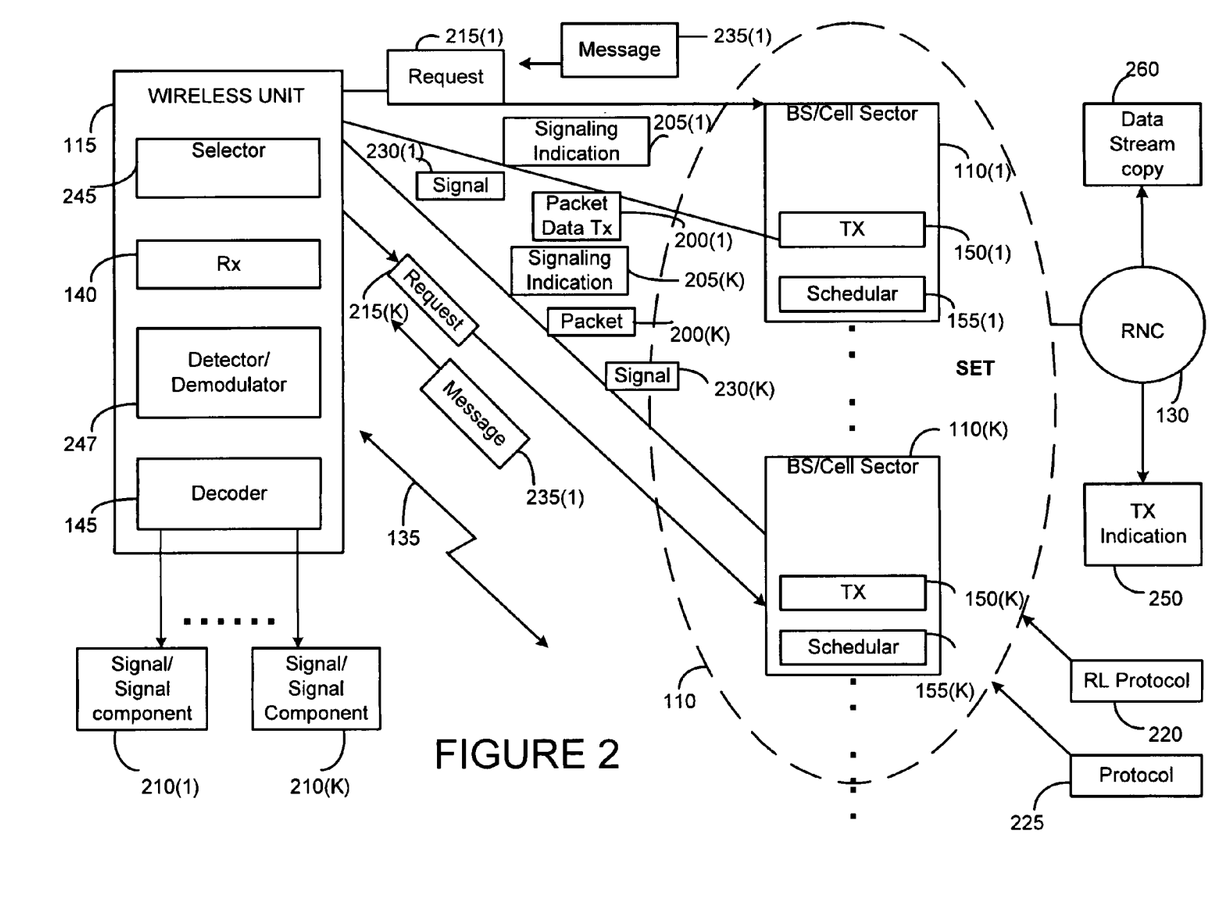
FIG. 2 schematically depicts a wireless unit and a set of base stations that enable a soft handoff on a forward link with a plurality of transmissions of packet data having an unsynchronized relationship in accordance with one illustrative embodiment of the present invention.

Other examples of such a protocol include a 1×EV-DO protocol, a UMTS protocol, a GSM protocol, and like. The radio network controller 130 may manage exchange of wireless communications between the wireless unit 115 and the first and second base stations 110(1-k) according to one illustrative embodiment of the present invention. Although two base stations 110(1-k) and one radio network controller 130 are shown in FIG. 2, persons of ordinary skill in the pertinent art having benefit of the present disclosure should appreciate that any desirable number of base stations 110 and radio network controllers 130 may be used.

Each of the first and second base stations 110(1-k), sometimes referred to as Node-Bs, may provide connectivity to associated geographical areas within a high-speed wireless data network. Persons of ordinary skill in the art should appreciate that portions of such a high-speed wireless data network may be suitably implemented in any number of ways to include other components using hardware, software, or a combination thereof. High-speed wireless data networks are known to persons of ordinary skill in the art and so, in the interest of clarity, only those aspects of the high-speed wireless data network 120 that are relevant to the present invention will be described herein.

Consistent with one embodiment, the wireless unit 115 may transmit messages to the first base station 110(1) or the second base station 110(k) over the forward link 120. A single forward link 120 may provide messages to the wireless unit 115. The messages may include traffic packets and signaling messages. The CDMA2000 1×EV-DO specification uses a frequency band with channel bandwidth (1.23 MHz) and chip rate (1.2288 Mcps). In CDMA2000 1×EV-DO, for example, each forward link frame is 26.666 msec and consists of 16 slots. Like the forward link, the reverse link frame is 26.666 msec and consists of 16 slots.

According to one embodiment, the wireless unit 115 may transmit messages or signals to one or more active base stations using one or more associated reverse links. Pseudo noise offsets (PN offsets) associated with each of the active base stations are included in an active set list, which is typically stored by the radio network controller 130 coupled to the first and second base stations 110(1-k). The wireless unit 115 may receive messages and/or signals over the forward link 120 between the wireless unit 115 and one of the active base stations, which is generally referred to as the serving base station or the serving sector. The 3rd Generation Partnership Project (3GPP) standard defines the role of a serving radio network controller based on 3GPP specifications.

Besides the messages or signals, the wireless unit 115 may receive traffic packets, such as data packets. Often the traffic packets include information that is intended for the user of the wireless unit 115. For example, traffic packets may include voice information, images, video, data requested from an Internet site, and the like. In contrast, signaling messages are used to provide information intended to be used by the wireless unit 115 and/or other elements of the spread-spectrum packet data system 100. Specifically, signaling messages may include configuration messages, setup instructions, switch instructions, handoff instructions, and the like.

In one embodiment, the reverse link 140 and the forward link 120 may be established on a plurality of channels. The channels, such as traffic and control channels may be associated with separate channel frequencies. For example, CDMA channels with associated channel number and frequency may form a wireless communication link for transmission of the high-rate packet data 125. In the forward link 120, for example, the wireless unit 115 may update the first base station 110(1) with a data rate to receive transmissions on a Forward Traffic Channel or a Forward Control Channel. The Traffic Channel carries user data packets. The Control Channel carries control messages, and it may also carry user traffic. The forward link 120 may use a Forward MAC Channel that includes four sub-channels including a Reverse Power Control (RPC) Channel, a Data Rate Control Lock (DRCLock) Channel, ACK channel and a Reverse Activity (RA) Channel.

In the reverse link 140, the wireless unit 115 may transmit on an Access Channel or a Traffic Channel. The Access Channel includes a Pilot Channel and a Data Channel. The Traffic Channel includes Pilot, MAC and Data Channels. The MAC Channel comprises four sub-channels including a Reverse Rate Indicator (RRI) sub-channel that is used to indicate whether the Data Channel is being transmitted on the Reverse Traffic Channel and the data rate. Another sub-channel is a Data Rate Control (DRC) that is used by the wireless unit 115 to indicate to the first base station 110(1) a data rate that the Forward Traffic Channel may support and the best serving sector. An acknowledgement (ACK) sub-channel is used by the wireless unit 115 to inform the first base station 110(1) whether the data packet transmitted on the Forward Traffic Channel has been received successfully. A Data Source Control (DSC) sub-channel is used to indicate which of the base station sectors should be transmitting forward link data.

Referring to FIG. 2, one exemplary embodiment of a method for enabling a soft handoff on the forward link 120 by signaling the wireless unit 115 about a plurality of transmission of same packet data 200(1-k) having an unsynchronized relationship is illustrated in accordance with one embodiment of the present invention. One or more signaling indications 205(1-k) may be used to establish the soft handoff on the forward link 120 in the wireless spread-spectrum packet data system 100, shown in FIG. 1. For example, the first base station 110(1) may provide a signaling indication 205(1) to the wireless unit 115 to indicate that at least the first and second base stations 110(1) and 110(k) of the set of base stations 110 (1-k) intend to transmit the same packet data 200(1) and 200(k) to the wireless unit 115.

Using the scheduler 155, each of the first and second base stations 110(1) and 110(k) may independently schedule transmission of packet data 200. That is, the scheduler 155(1) of the first base station 110(1) may schedule the transmission of packet data 200(1) independently from the transmission of packet data 200(k) from the second base station 110(k). The independent scheduling of transmission of packet data 200(1) and 200(k) may enable independent decoding thereof into a first signal 210(1) and a second signal 210(k) associated with the first and second base stations 110(1), 110(k), respectfully. In other words, the decoder 145 at the wireless unit 115 may independently decode the independently scheduled transmission of same packet data 200(1) and 200(k) into the first signal or signal component 210(1) and the second signal or signal component 210(k) in the soft handoff on the forward link 120.

In one embodiment, the wireless unit 115 may request transmission of high-rate packet data 125, as shown in FIG. 1, from at least two cell sectors associated with one or more of the set of base stations 110(1-k). To this end, the wireless unit 115 may issue a first request 115(1) and/or a second request 115(k) to the first base station 110(1), the second base station 110(k), respectfully. Alternatively, the wireless unit 115 may signal the first request 215(1) to the first base station 110(1) for transmission of the same packet data 200(1) from a plurality of base station or cell sectors.

To establish the soft handoff on the forward link 120, the wireless spread-spectrum packet data system 100 may use a protocol 220 that provides soft handoff on the reverse link 140 based on a wireless spread-spectrum communication protocol 225. In one embodiment, the wireless spread-spectrum communication protocol 225 may be based on a cellular network, which at least in part, may be based on a Universal Mobile Telecommunications System (UMTS) standard. The cellular network may be related to any one of the 2G, 3G, or 4G standards that employ any one of the protocols including the UMTS, CDMA2000, or the like, however, use of a particular standard or a specific protocol is a matter of design choice and not necessarily material to the present invention.

In one embodiment, a conventional Open Systems Interconnection (OSI) model may enable transmission of the request 215(1), the signaling indication 205(1), the packet data 200(1) and other data including messages, packets, datagram, frames, and the like between the wireless unit 115 and the set of base stations 110(1-k). The term "packet data" may include information or media content that has been arranged in a desired manner. The packet data 200(1) may be transmitted as frames including, but not limited to, a radio link protocol (RLP) frame, signaling link protocol (SLP) frame or any other desired format. Examples of data in the packet data 200(1) may include payload data representative of voice, video, signaling, media content, or any other type of information based on a specific application.

Consistent with one embodiment, the wireless unit 115 may provide signaling that includes one or more messages to a base station, e.g., the first base station 110(1) of the set of base stations 110(1-k) for requesting a reduced active set of base stations as a subset of an active set that is associated with the reverse link 140. The reduced active set of base stations may be used to provide the soft handoff on the forward link 120 for transmission of the same packet data 200(1). Alternatively, the first base station 110(1) may modify a format of a data source channel to request switching to a multi-sector transmission mode.

In operation, the radio network controller 130 may determine whether the wireless unit 115 is in a handoff mode. If so, the radio network controller 130 may provide signaling to the wireless unit 115 to indicate a set of at least two base station/cell sectors associated with the set of base stations 110(1-k) that intend to transmit the same packet data 200(1-k) to the wireless unit 115.

For the purposes of establishing a soft handoff on the forward link 120 for the set of at least two base station/cell sectors associated with the first base station 110(1), the wireless unit 115 may transmit the first request 215(1) from the first base station 110(1). In response to the first request 215(1), the wireless unit 115 may receive a first message 235(1) indicating a set of at least two base station/sectors that intend to transmit the same packet data 200(1). The wireless unit 115 may receive a signal 230 from each of the set of at least two base station/cell sectors for simultaneously decoding the received signal into a corresponding signal component 210. That is, the first signal 230(1) may result in a first signal/signal component 210(1) and the second signal 230(k) may result in the second signal/signal component 210(k).

While the decoder 145 at the wireless unit 115 may independently decode the signals 230(1-k) from the set of at least two base stations/cell sectors 110(1), 110(k), a selector 245 may select a desired packet from each of the corresponding signal component 210 arriving from the set of at least two base station sectors in an active set of base station sectors during the stand soft handoff. The wireless unit 115 may comprise a detector/demodulator 247 to detect and/or demodulate the signals 230(1), 230(k) from each of the set of at least two base station/sectors. The wireless unit 115 may acknowledge a simultaneous reception of the same packet data 200(1) and 200(k) from the active set of base station sectors in the soft handoff. The radio network controller 130 may send a copy of a data stream 260 to the active set of base station/cell sectors participating in the soft handoff on the forward link 120 to enable the soft handoff in a multi-sector transmission mode.

By enabling the set of at least first and second base station/cell sectors 110(1), 110(k) to schedule independently the first and second same packet data 200(1) 200(k) transmissions to the wireless unit 115, the transmission of same data in the same packet data 200(1) and 200(k) may be obtained without synchronizing the transmissions. Additionally, the wireless unit 115 may request a downlink data rate from the set of at least the first and second base station/cell sectors 110(1), 110(k), participating in the soft handoff on the forward like 120. Likewise, the set of at least the first and second base station/cell sectors 110(1), 110(k) may receive from a serving base station sector or data rate request channel and operate on a data rate request channel independent of a unique "code cover" used on the data rate request channel.

According to one embodiment of the present invention, the wireless unit 115 may support a multi-carrier transmission mode instead of a multi-sector transmission mode, as described above. To support the multi-carrier transmission mode from a single base station/cell sector of the at least first and second base station/cell sectors, a plurality of carriers may be assigned to one or more of the signal components 210(1-k) arriving from the single base station/cell sector. While a data rate request channel may be used to signal a rate with respect to the plurality of carriers to the single base station sector, an acknowledgment channel may be used to signal an acknowledgment decision. The receiver 140 and the decoder 145 at the wireless unit 115 may provide an independent decoding the first and second same packet data 200(1), 200(k) transmissions associated with the multi-carrier transmission mode from the single base station sector.

Figure 3:
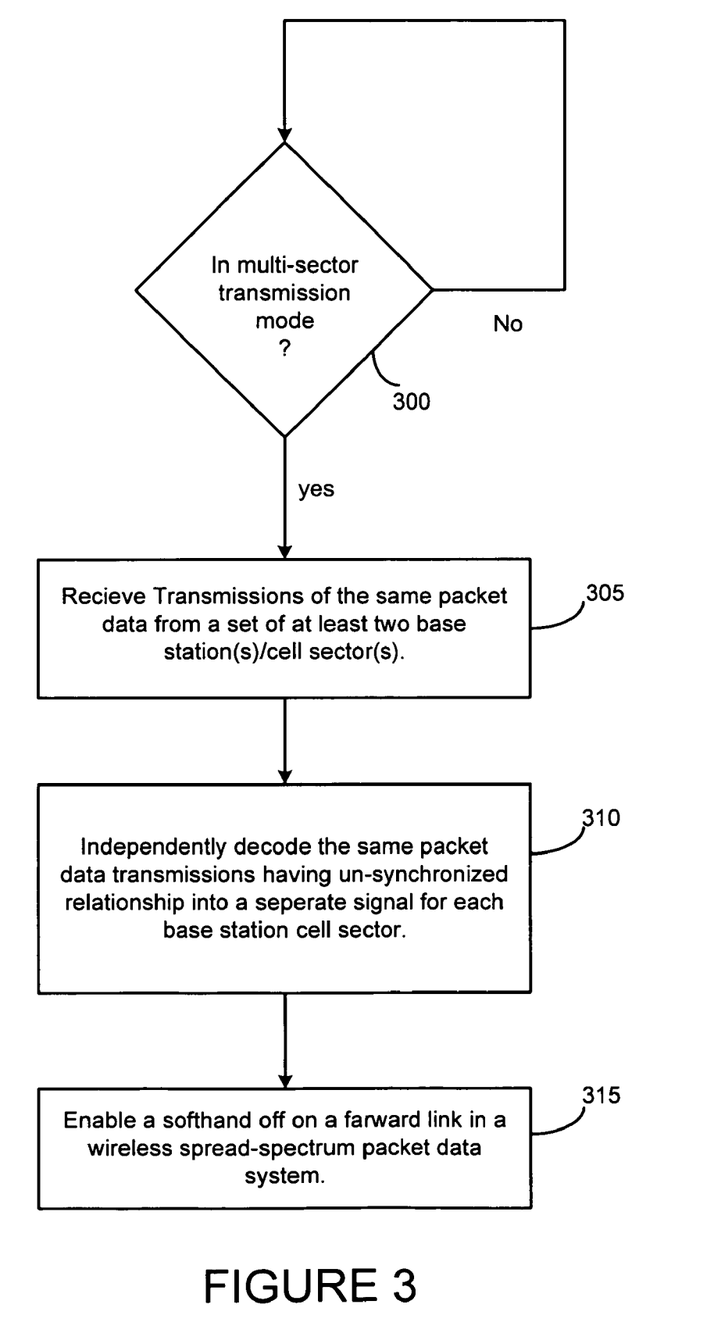
FIG. 3 depicts a stylized representation for implementing a method of wireless communication between the wireless unit and the set of base stations, as shown in FIG. 2, consistent with one exemplary embodiment of the present invention.

Referring to FIG. 3, a method is illustrated for enabling a soft handoff on the forward link 120 in the wireless spread-spectrum packet data system 100, as shown in FIGS. 1-2, according to one exemplary embodiment of the present invention. At block 300, at the wireless unit 115, the receiver 140 may perform a check to ascertain whether the wireless unit 115 is in a multi-sector transmission mode. In one embodiment, to transition to the multi-sector transmission mode one or more signaling indications 205(1), 205(k) may be received. For example, the first base station 110(1-k) may provide the signaling indication 205(1) and the second base station 110(1-k) may provide the second indication 205(k) during the soft handoff on the forward link 120. Alternatively, the first base station 110(1) may provide a single indication, i.e., the signaling indication 205(1) for at least two base station/cell sectors associated therewith.

At block 305, the wireless unit 115 may receive transmissions of the same packet data 200(1), 200(k) from the set of at least two base stations/cell sectors 110(1), 110(k). The decoder 145 may independently decode the same packet data 200(1), 200(k) transmissions having an unsynchronized relationship into a separate signal or a signal component 210 for each base station/cell sector, as indicated in block 310. In this manner, as shown at block 315, a soft handoff on the forward link 120 may be enabled in the wireless spread-spectrum packet data system 100, without needing to synchronize the transmissions of the same packet data 200(1-k).

Figure 4:
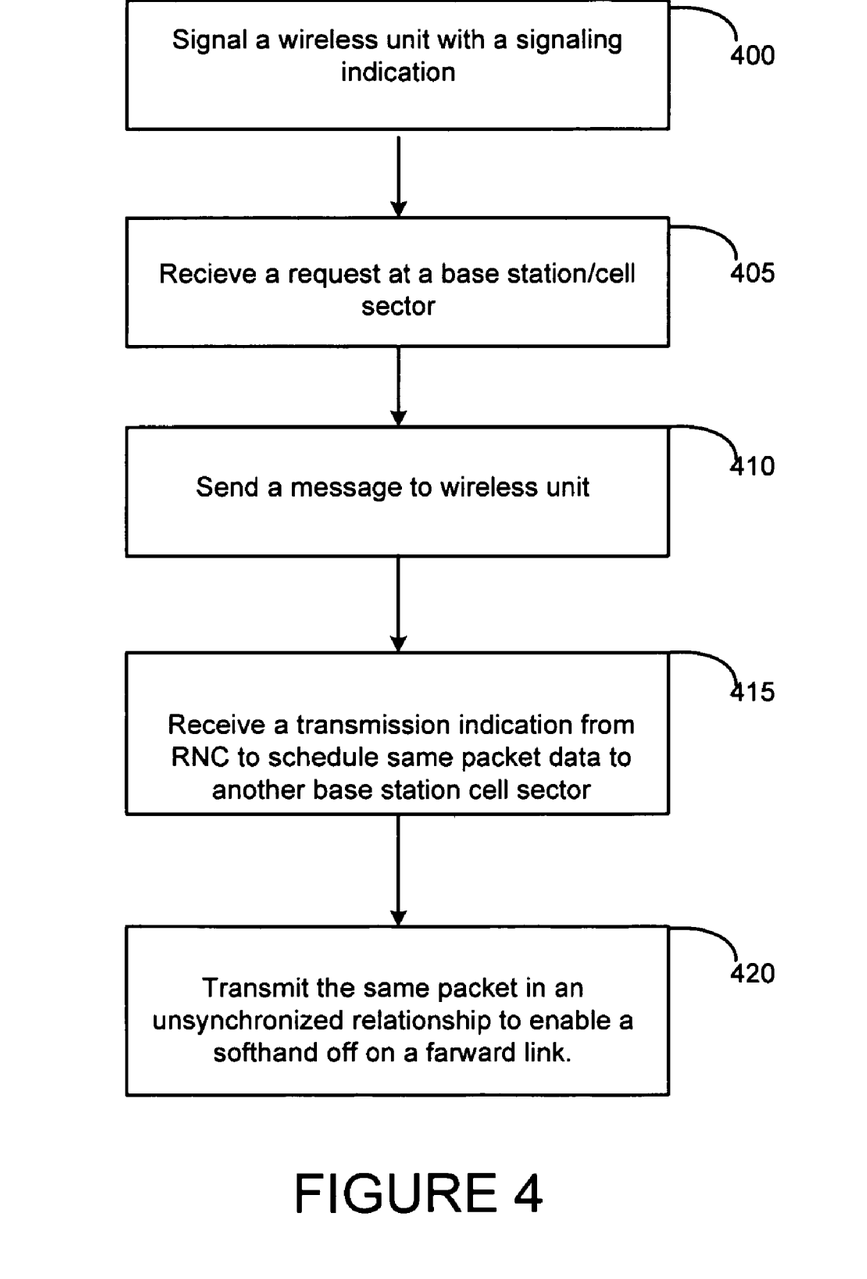
FIG. 4 illustrates a stylized representation for implementing a method of establishing a soft handoff on a forward link using a set of at least two base station sectors in accordance with one illustrative embodiment of the present invention.

Turning now to FIG. 4, to establish the soft handoff on the forward link 120, a method is schematically depicted in which there is no need to synchronize the transmissions of the same data to a particular wireless unit, such as the wireless unit 115, according to one embodiment of the present invention. In other words, the wireless unit 115 may not soft combine the transmissions of the same packet data 200(1-k) at the wireless unit 115 to support a handoff capability. To the end, the wireless unit 115 may implement a detection/modification function at the detector/demodulator 247, which is capable of simultaneously receiving and decoding signals 230(1-k) from two or more base station/cell sectors 110(1-k).

To establish the soft handoff in the forward link 120, in accordance with one embodiment of the present invention, the selector 245 selects a correctly received packet at a radio link protocol (RLP) layer and discards a duplicate packet if more than one copy is received. The detector/demodulator simultaneously receives and decodes the signals 230(1-k) from at least two or more base station/cell sectors 110(1-k). Since the signals 230(1-k) may be independently decoded by the decoder 245, the wireless unit 115 does not need to soft-combine the signals 230(1-k) received from the multiple sectors that may be participating in the handoff. The selector 145, in this way, may provide a benefit of achieving diversity through selection of the correctly received packet data 200. For example, in one embodiment, the same packet data 200(1-k) may be received at the RLP layer.

In a handoff mode, the radio network controller (RNC) 130 may send multiple copies of the same RLP data stream to multiple base stations/cell sectors 110(1-k) participating in the soft handoff. Since no soft-combining at the wireless mobile unit 115 is performed, the set of base stations/cell sectors 110(1-k) may independently schedule the same packet data 200(1-k) transmissions to the wireless unit 115. In other words, synchronization of the transmissions of the same data to a particular wireless unit, such as the wireless unit 115 from the multiple base stations/cell sectors is not desired.

In one embodiment, the wireless unit 115 may receive signaling that indicates a set of base station/cell sectors 110 that may be transmitting useful data to the wireless unit 115. In one embodiment the signaling may be implicit, or alternatively, the signaling may be provided in an explicit manner. In case of implicit signaling, all base stations/cell sectors 110 (1-k) indicated in the request 215(1), i.e., a mobile handoff request or all the base stations 110(1-k), specified in the active set associated with the reverse link 140 may be determined to transmit data to the wireless unit 115. In case of explicit signaling, the first base stations/cell sector 110(1) may send the message 235(1) to the wireless unit 115, informing the wireless unit 115 of a set of base station/cell sectors 110 that may be transmitting the packet data 200.

Figure 5:
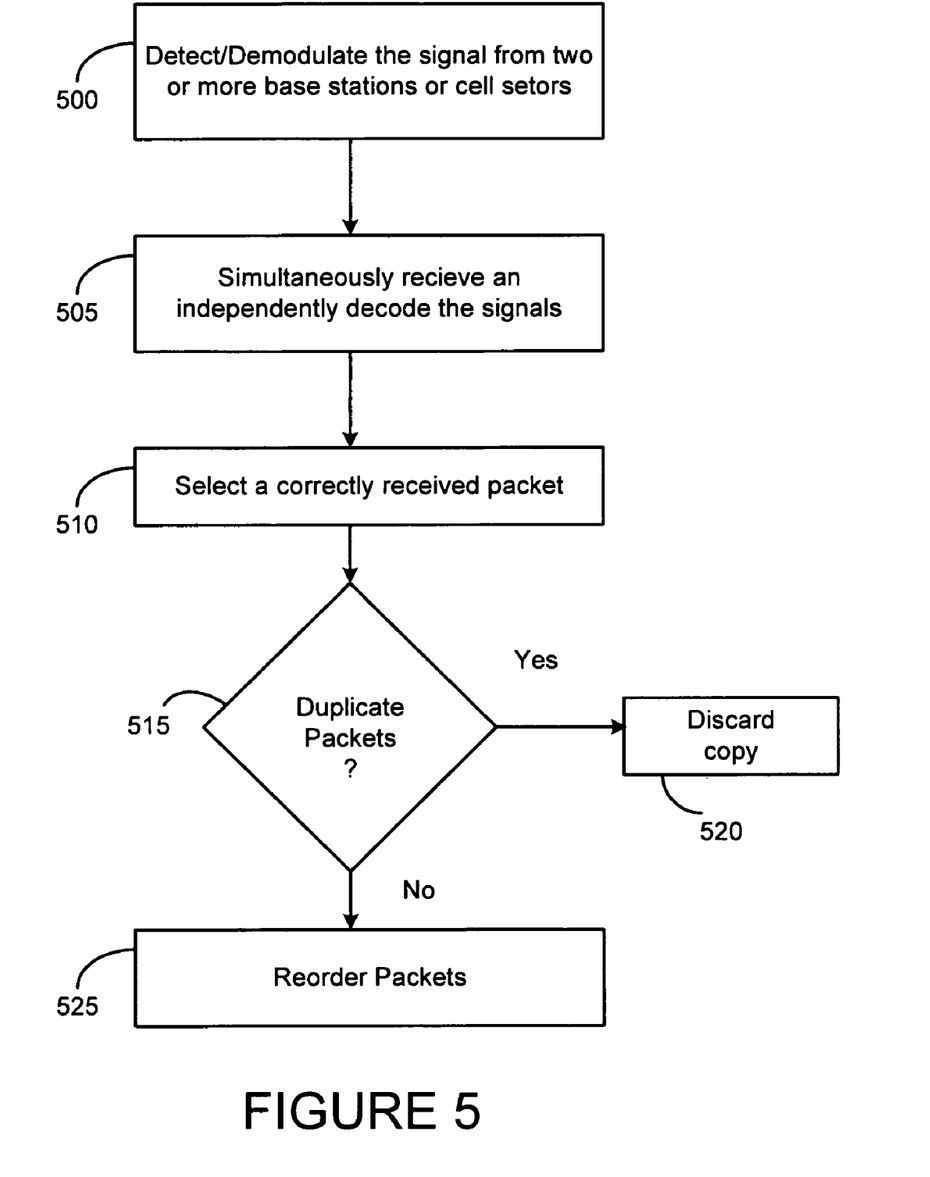
FIG. 5 illustrates a stylized representation for implementing a method of establishing a soft handoff on a forward link using a set of at least two base station sectors in accordance with one illustrative embodiment of the present invention.

Referring to FIG. 5, at block 500, the wireless unit 115 may detect/demodulate the signals 230(1-k) using the detectors/demodulator 247, from two or more base stations or cell sectors 110(1-k). In this way, at block 505, the wireless unit 115 may simultaneously receive and independently decode the signals 230(1-k) using the receiver 140 and the decoder 145. The selector 245 may select a correctly received packet from the packet data 200, as shown in block 510. A check at a decision block 515 may determine whether duplicate packets are available. If so, at block 520, a copy of the duplicate packet may be discarded. At block 525, one or more non-duplicate packet(s) may be reordered for the soft handoff established on the forward link 120 based on the unsynchronized transmission of the same packet data 220(1-k) without soft-combining the signals 230(1-k).

In one embodiment, the wireless spread-spectrum packet data system 100 may wirelessly communicate mobile data at a speed and coverage desired by individual users or enterprises. According to one embodiment, the high-speed wireless data network may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS also referred as Wideband Code Division Multiple Access (WCDMA) includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of wireless communication between a wireless unit and a set of base stations, the method comprising:
    signaling said wireless unit about a plurality of transmissions of a data packet from at least two base stations of said set of base stations to enable a handoff on a forward link, said plurality of transmissions of the data packet being unsynchronized;
    enabling said wireless unit to select a desired packet from each of said plurality of transmissions of same packet data;
    enabling said wireless unit to discard a duplicate packet across said plurality of transmissions of said same packet data; and
    enabling said wireless unit to reorder a non-duplicate packet in each of said plurality of transmissions of said same packet data.

2. A method of claim 1, wherein signaling said wireless unit further comprises:
    enabling said wireless unit to receive asynchronously same packet in said plurality of transmission; and
    enabling said wireless unit to decode said plurality of transmissions of said same packet data independently into a plurality of signals, each of said signals associated with a different sector of said set of base stations in a wireless spread-spectrum packet data system.

3. A method of claim 1, wherein providing a signaling indication further comprises:
    providing a signaling indication to said wireless unit to indicate that at least a first and a second base station of said set of base stations intend to transmit said same packet data to said wireless unit; and
    using said signaling indication to establish a soft handoff on said forward link of a wireless spread-spectrum packet data system.

4. A method of claim 3, further comprising:
    signaling said wireless unit about a first and a second base stations of said set of base stations, each of said first and second base stations to independently schedule transmission of said same packet data for independently decoding a signal associated therewith in said soft handoff on said forward link.

5. A method of claim 4, further comprising:
requesting transmission of said same packet data from at least two cell sectors associated with one or more of said set of base stations.

6. A method of claim 1, further comprising
using a protocol that provides a reverse link soft handoff to establish a soft handoff on said forward link in a high rate packet data system based on a wireless spread-spectrum communication protocol.

7. A method of claim 1, further comprising:
signaling one or more messages to a base station of said set of base stations for requesting a reduced active set of base stations as a subset of an active set associated with a reverse link to provide a soft handoff on said forward link for transmission of said same packet data.

8. A method of claim 1, further comprising:
modifying a format of a data source channel to request switching to a multi-sector transmission mode.

9. A method of claim 1, further comprising:
determining whether said wireless unit is in a handoff mode; and
if so, signaling from a radio network controller an indication to said wireless unit to indicate a set of at least two base station sectors associated with said set of base stations that intend to transmit same packet data to said wireless unit.

10. A method of wireless communication between a wireless unit and a base station, the method comprising:
signaling a request to said base station for transmission of a data packet from a plurality of base station sectors, said transmission of the data packet having an unsynchronized relationship across said plurality of base station sectors;
in response to said request, receiving a message indicating a set of at least two base station sectors that intend to transmit the data packet to said wireless unit;
establishing a handoff on a forward link for said set of at least two base station sectors;
receiving at said wireless unit a signal from each of said set of at least two base station sectors in an active set of base station sectors during a soft handoff for simultaneously decoding said each signal into a corresponding signal component,
selecting a desired packet from each of said corresponding signal component arriving from said set of at least two base station sectors;
discarding a duplicate packet across each of said signal associated with each of said set of at least two base station sectors; and
reordering a non-duplicate packet in each of said signal associated with each of said set of at least two base station sectors.

11. A method of claim 10, further comprising:
receiving at said wireless unit a signal from each of said set of at least two base station sectors in an active set of base station sectors during a soft handoff for simultaneously decoding said each signal into a corresponding signal component.

12. A method of claim 10, further comprising:
modifying a format of an acknowledgement channel to acknowledge reception of a same packet data from said active set of base station sectors in said soft handoff.

13. A method of claim 10, further comprising:
causing a radio network controller to send a copy of a data stream to said active set of base station sectors participating in a soft handoff on said forward link.

14. A method of wireless communication between a base station and at least one wireless unit, the method comprising:
providing a message indicating a set of at least a first and a second base station sectors of a plurality of base station sectors that intend to transmit to said wireless unit;
scheduling a first and a second transmissions of same packet data having an unsynchronized relationship across said firsts and said second base station sectors for separately decoding at said wireless unit into a first a second signals, respectively:
establishing a handoff on a forward link,
enabling said wireless unit to select a desired packet from each of said first and second transmissions of said same packet data;
enabling said wireless unit to discard a duplicate packet across said first and second transmissions of said same packet data; and
enabling said wireless unit to reorder a non-duplicate packet in each of said first and second transmissions of said same packet data.

15. A method of wireless communication between a base station and a wireless unit, the method comprising:
providing a message indicating a set of at least a first and a second base station sectors of a plurality of base station sectors that intend to transmit to said wireless unit;
scheduling a first and a second transmissions of same packet data having an unsynchronized relationship across said first and said second base station sectors for separately decoding at said wireless unit into a first and a second signals, respectively;
establishing a soft handoff on a forward link;
modifying a format of a data rate request channel to enable said set of at least said first and said second base station sectors to independently schedule said first and second transmissions of said same packet data to said wireless unit without synchronizing transmission of said same packet data.

16. A method of claim 15, further comprising:
modifying a format of the data rate request channel and an acknowledgement channel to provide a per handoff leg data rate request and acknowledgement channels to use a per handoff leg signaling that is used per carrier in a multi-carrier transmission mode; and
enabling a multi-sector transmission mode for said forward link on the same carrier of said multi-carrier transmission mode.

17. A method of claim 16, further comprising:
transmitting said acknowledgement channel and a data rate request channel to one base station sector only;
receiving said data rate request channel on said plurality of base station sectors; and
ignoring said acknowledgement channel on said plurality of base station sectors except the said one base station sector at which the said acknowledgement channel has been transmitted to enable a multi-carrier transmission mode for said forward link to said one base station sector.

18. A method of claim 15, further comprising:
measuring a signal strength of each pilot of each base station sector of said plurality of base station sectors; and
in response to a majority of pilots indicate said signal strength to be below a weak signal threshold, switching from a multi-carrier transmission mode from a signle base station sector to a multi-sector transmission mode on the same carrier of said multi-carrier transmission mode.

19. A method of claim 15, further comprising:

measuring a signal strength of each pilot of each base station sector of said plurality of base station sectors; and in response to at least one pilot indicates said signal strength to be above a strong signal threshold, switching from a multi-sector transmission mode on the same carrier of said multi-carrier transmission mode to a multi-carrier transmission mode from a signle base station sector.

20. A method of claim 15, further comprising:

enabling said wireless unit to request a downlink data rate from said set of at least said first and second base station sectors participating in said soft handoff on said forward link.

21. A method of claim 15 further comprising:

enabling said set of at least said first and second base station sectors to receive and operate upon a data rate request channel independent of a unique code cover used from a serving base station sector on said data rate request channel.

22. A method of claim 15 further comprising:

using a receiver at said wireless unit for independently decoding said first and second transmissions of said same packet data associated with a multi-carrier transmission mode from a single base station sector.

23. A method of claim 15, further comprising:

transmitting said data rate request channel to one base station sector only;

receiving said data rate request channel on said plurality of base station sectors; and disabling said acknowledgment channel in a multi-sector transmission mode to enable the multi-sector transmission mode for said forward link.

* * * * *